(12) United States Patent
Wang et al.

(10) Patent No.: US 8,706,283 B2
(45) Date of Patent: *Apr. 22, 2014

(54) SYSTEM FOR EVALUATING MANUFACTURABILITY OF A CASTING DESIGN

(75) Inventors: Qigui Wang, Rochester Hills, MI (US); Yucong Wang, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1027 days.

This patent is subject to a terminal disclaimer.

(21) Appl. No.: 12/356,226

(22) Filed: Jan. 20, 2009

(65) Prior Publication Data

US 2010/0185312 A1    Jul. 22, 2010

(51) Int. Cl.
  *G06F 17/50*    (2006.01)
  *G06F 19/00*    (2011.01)
(52) U.S. Cl.
  USPC .............................. 700/105; 706/919; 703/1
(58) Field of Classification Search
  USPC .............. 700/97, 98, 103–105; 706/903, 904, 706/906, 911, 912, 914, 919–923; 703/1, 7; 345/418–420; 715/964
  See application file for complete search history.

(56) References Cited

U.S. PATENT DOCUMENTS

| | | | | |
|---|---|---|---|---|
| 5,435,818 A | * | 7/1995 | Mashige et al. | 65/29.12 |
| 5,822,206 A | * | 10/1998 | Sebastian et al. | 700/97 |
| 6,161,057 A | * | 12/2000 | Nakano | 700/197 |
| 6,223,092 B1 | * | 4/2001 | Miyakawa et al. | 700/103 |
| 6,298,898 B1 | * | 10/2001 | Mahadeva et al. | 164/4.1 |
| 6,484,063 B1 | * | 11/2002 | Liou et al. | 700/98 |
| 6,741,265 B2 | * | 5/2004 | Ghosh et al. | 715/751 |
| 6,882,893 B2 | * | 4/2005 | Uchida et al. | 700/98 |
| 7,016,749 B2 | * | 3/2006 | Kuzumaki et al. | 700/97 |
| 7,096,083 B2 | * | 8/2006 | Kaneto et al. | 700/97 |
| 7,123,985 B2 | * | 10/2006 | Wildsmith et al. | 700/197 |
| 7,299,163 B2 | * | 11/2007 | Iimi et al. | 703/2 |
| 7,630,783 B2 | * | 12/2009 | Walls-Manning et al. | 700/98 |

(Continued)

FOREIGN PATENT DOCUMENTS

EP        508308 A2 * 10/1992 ........... G05B 19/417

OTHER PUBLICATIONS

Banerjee et al. 2007. "Incorporating manufacturability considerations during design of injection molded multi-material objects." Research in Engineering Design 17, No. 4: 207-231. Academic Search Premier, EBSCOhost (accessed Sep. 4, 2013).*

*Primary Examiner* — M. N. Von Buhr
(74) *Attorney, Agent, or Firm* — Dinsmore & Shohl LLP

(57) ABSTRACT

A system for evaluating a manufacturability of a casting design. The system includes at least one of a geometry analyzer, a casting evaluation tool, a residual stress evaluation tool, and a machining evaluation tool. The geometry analyzer analyzes a geometric design of the casting design to determine its geometric design-ability, the casting evaluation tool evaluates the casting design to determine its cast-ability, the residual stress evaluation tool evaluates the casting design to determine its heat treat-ability, and the machining evaluation tool evaluates the casting design to determine a machine-ability of the casting design. If the casting design is determined as not geometrically design-able, not cast-able, not heat treat-able, or not machine-able by the geometry analyzer, the casting evaluation tool, the residual stress evaluation tool, or the machining evaluation tool, respectively, then modifications to the casting design are recommended to optimize the casting design for manufacturing.

20 Claims, 10 Drawing Sheets

(56) References Cited

U.S. PATENT DOCUMENTS

| | | | |
|---|---|---|---|
| 7,761,263 B2 * | 7/2010 | Wang et al. | 703/1 |
| 7,840,443 B2 * | 11/2010 | Lukis et al. | 705/26.4 |
| 7,937,183 B2 * | 5/2011 | Yamasaki et al. | 700/204 |
| 8,214,182 B2 * | 7/2012 | Wang et al. | 703/2 |
| 8,437,991 B2 * | 5/2013 | Wang et al. | 703/6 |
| 8,447,574 B2 * | 5/2013 | Wang et al. | 703/2 |
| 2002/0143503 A1 * | 10/2002 | Wang et al. | 703/1 |
| 2004/0122630 A1 * | 6/2004 | Fife | 703/2 |
| 2005/0060130 A1 * | 3/2005 | Shapiro et al. | 703/2 |
| 2005/0071136 A1 * | 3/2005 | Vredenburgh et al. | 703/1 |
| 2006/0064288 A1 * | 3/2006 | Ferryanto et al. | 703/2 |
| 2006/0074614 A1 * | 4/2006 | Chang et al. | 703/6 |
| 2006/0277004 A1 | 12/2006 | Wang et al. | |
| 2006/0282186 A1 * | 12/2006 | Hansen et al. | 700/97 |
| 2007/0010984 A1 * | 1/2007 | Nishiura et al. | 703/22 |
| 2007/0038531 A1 | 2/2007 | Lukis et al. | |
| 2007/0188490 A1 * | 8/2007 | Kanai et al. | 345/423 |
| 2007/0288209 A1 * | 12/2007 | Watanabe | 703/2 |
| 2009/0071261 A1 * | 3/2009 | Li et al. | 73/818 |
| 2010/0010782 A1 * | 1/2010 | Zhu et al. | 703/1 |
| 2010/0087942 A1 * | 4/2010 | Sims, Jr. | 700/103 |

* cited by examiner

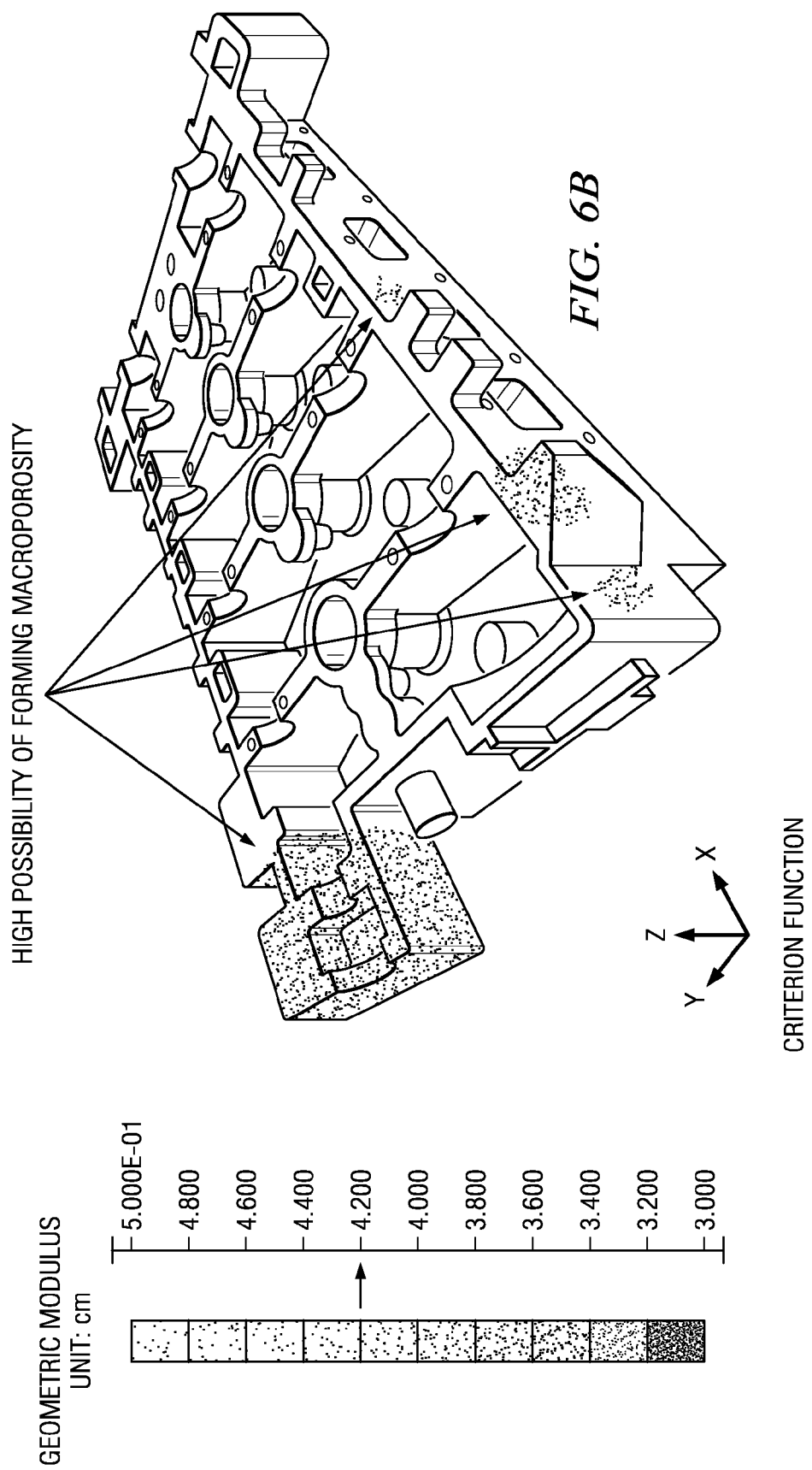

SYSTEM FOR EVALUATING MANUFACTURABILITY OF A CASTING DESIGN

BACKGROUND

The present invention relates generally to the optimization of designs of castings for manufacturing and, more particularly, to systems and methods for quickly and reliably evaluating manufacturability of casting designs.

Due to low manufacturing costs, high flexibility, and near net shape forming, castings increasingly are being used in a large number of industries. In many industries, castings are designed mechanically to meet desired functional requirements. As such, little consideration is given to the manufacturability of the castings not only because there exists a general lack of understanding of the significance of designing castings for manufacturing, but also because computational systems and tools generally are unavailable for casting designers to access to easily and reliably evaluate the manufacturability of the castings, not to mention the limited capabilities of currently available computational systems and tools. As used herein, "conventional" refers to technologies, such as, but not limited to practices, methods, systems, and tools, of the prior art, i.e., that were in existence and publicly disclosed prior to the conception of the present invention.

For example, in conventional casting design practices, casting designers forward casting designs to casting analysts and/or machining analysts for cast-ability and machine-ability evaluations. This remains the practice even though common manufacturability evaluations are very limited in their evaluating abilities. For instance, in cast-ability evaluations, interpretation of computed results heavily relies on the expertise of casting analysts. In addition, even with availability of sophisticated casting process simulation modules and user interfaces that provide colorful visualization of predicted results of heat transfer and fluid flow events that occur during casting processes, it remains difficult and time consuming to systematically optimize casting designs without demanding significant human interaction and numerous manual trial-and-error interactions. As a result, conventional casting design processes generally entail lengthy development cycles and low reliability for determining manufacturability due to variations in individual knowledge and experience of those evaluating the casting designs and the manufacturability thereof.

In addition, a fundamental problem facing foundries is the development of an adequate riser design for feeding a casting. The conventional approach to riser size estimation is to calculate the volume and cooling surface area of various parts or areas of the casting and use those measurements to derive the geometric modulus. Areas of the casting that have the lowest geometric modulus values solidify first, while those regions with the highest geometric modulus values solidify last. In general, the geometric modulus values govern the design of the riser in heavy-section castings. While these concepts may be simple and straightforward, their implementation in casting design is not. This is due to the difficulty in manually calculating volumes and surface areas for complex castings. In industry applications, the approach taken by most foundry engineers is similar to that of weight calculation. The casting design is arbitrarily broken into a number of pieces, and each of these pieces is identified as a simple geometric shape for which surface area and volume can be calculated. In practice, however, this process is cumbersome and inaccurate. The arbitrariness of approximating a casting design with a series of simple shapes reduces both repeatability and accuracy.

Another intrinsic problem with this method is that it is based only on geometry as it does not directly take into account thermal effects, such as specific properties of chilling or insulating materials and heat saturation of cores or various areas of the mold. While some factors have been proposed to correct these effects, such factors can increase the uncertainty surrounding the accuracy of results.

More recently, use of computer simulations of casting-related manufacturing processes using three-dimensional computer models has become increasingly widespread. Such simulations can predict, to a certain degree of accuracy, the progressive solidification of the casting and its rigging system and the potential for casting defect formation. One drawback of the use of such simulations, however, is that it requires an initial casting design to evaluate in simulated processes. Many foundries, even those using the most advanced simulation tools, still use a conventional approach when developing the initial casting design for simulation. In general, this requires calculating approximate surface areas, volumes, and geometric modulus values through manual or software-based methods to break the casting design into simple shapes.

Additionally, because of metal and alloy shrinkage and, in particular, thermal non-uniformity during cooling in solidification process and quench process of heat treatment, the final cast components can have high residual stress levels and significant geometric distortion prior to machining. It is generally believed that residual stress levels in castings are related primarily to the geometric design of the casting, especially during the heat treatment process. More particularly, high stress levels developed in the casting can lead to hot tear during solidification and cracking or severe distortion of the casting during heat treatment process. Unfortunately, there is no simple and reliable method, tool, or system available for easily and quickly checking a manufacturability of a casting. In evaluating machining feasibility of a casting, for example, the machining analyst requires final geometrical information of the casting after solidification and/or heat treatment depending upon the manufacturing process defined. The precise predictions or measurements of the final geometric dimensions of the casting are very important for accurate evaluation of an ability of a casting to be machined during a machining process. Actual measurement of the final casting components is doable, but expensive and time-consuming.

As such, there exists a need for a system for easily and reliably evaluating manufacturability of casting designs. In particular, there is a need in the art for systems and methodologies that allow casting designers to quickly assess the manufacturability of casting designs proposed for manufacturing and, further, to optimize casting designs for manufacturability including, but not limited to, geometric design-ability, cast-ability, heat treat-ability, and machine-ability.

SUMMARY

It is against the above background that embodiments of the present invention provide systems and methods for evaluating manufacturability of casting designs.

In accordance with one exemplary embodiment, a system for evaluating a manufacturability of a casting design comprises at least one of a geometry analyzer, a casting evaluation tool, a residual stress evaluation tool, and a machining evaluation tool. The geometry analyzer analyzes a geometric design of the casting design for compliance with a geometric design rule of casting manufacturing principles to determine a geometric design-ability of the casting design. The casting evaluation tool evaluates a virtual casting defined by the casting design and cast through a simulated casting process, the virtual casting evaluated for a formation of casting defects to determine a cast-ability of the casting design. The residual stress evaluation tool evaluates the virtual casting heat treated through a simulated heat treatment process for stress levels and for a formation of potential cracks to determine a heat treat-ability of the casting design. The machining evaluation tool evaluates the virtual casting machined through a simulated machining process for at least one of a formation of cracks and dimensional accuracy to determine a machine-ability of the casting design. At least one of the geometry analyzer, the casting evaluation tool, the residual stress evaluation tool, and the machining evaluation tool recommends a modification to the casting design to optimize the casting design for manufacturing if the casting design is determined as not geometrically design-able, not cast-able, not heat treat-able, or not machine-able by the geometry analyzer, the casting evaluation tool, the residual stress evaluation tool, or the machining evaluation tool, respectively.

Optionally, the modification to the casting design recommended by at least one of the geometry analyzer, the casting evaluation tool, the residual stress evaluation tool, and the machining evaluation tool, may include a modification to at least one of a geometric design of the casting design, a metal or alloy to form the casting design, a material to form a casting mold, a quench media, a dimension of machining stock of the casting design, a casting process, a heat treatment process, and a machining process. Further, the casting design modified as recommended by at least one of the geometry analyzer, then casting evaluation tool, the residual stress evaluation tool, and the machining evaluation tool may be evaluated for manufacturability by the system. In addition, the geometry analyzer may comprise a geometric casting design tool that creates and/or modifies the casting design for manufacturability evaluation by the system. The geometry analyzer may recognize and accept for manufacturability evaluation casting designs created by conventional geometric casting design tools and may be compatible for integration and operation with conventional geometric casting design tools. Also, the system may further comprise a simulation module for performing at least one of the simulated casting process, the simulated heat treatment process, and the simulated machining process.

In accordance with another exemplary embodiment, a system for evaluating a manufacturability of a casting design comprises at least one of a working database, a geometry analyzer, a casting evaluation tool, a residual stress evaluation tool, and a machining evaluation tool. The working database comprises data related to a manufacturing of a casting defined by the casting design. The geometry analyzer comprises a search engine and a knowledge database that analyze data of the working database to evaluate the casting design for compliance with casting design principles to determine a geometric design-ability of the casting design. The casting evaluation tool comprises a geometry modulus calculator that calculates data of the working database to evaluate the casting design for a potential for a formation of casting defects in the casting defined by the casting design to determine a cast-ability of the casting design. The residual stress evaluation tool comprises a stress level calculator that calculates data of the working database to evaluate the casting design for stress levels and for a potential for a formation of cracks in the casting defined by the casting design to determine a heat treat-ability of the casting design. The machining evaluation tool comprises a distortion calculator that calculates data of the working database to evaluate the casting design for a potential for a formation of cracks and for dimensional accuracy of the casting defined by the casting design to determine a machine-ability of the casting design. At least one of the geometry analyzer, the casting evaluation tool, the residual stress evaluation tool, and the machining evaluation tool recommends a modification to the casting design to optimize the casting design for manufacturing if the casting design is determined as not geometrically design-able, not cast-able, not heat treat-able, or not machine-able by the geometry analyzer, the casting evaluation tool, the residual stress evaluation tool, or the machining evaluation tool, respectively.

Optionally, the working database may be integrated into the geometry analyzer. The knowledge database may comprise data related to casting manufacturing principles. The data of the working database related to the manufacturing of the casting defined by the casting design may include at least one of a geometric design of the casting design, a metal or alloy, or both, to form the casting, a material to form a casting mold, a quench media to cool the casting, a dimension of machining stock of the casting, a casting process to form the casting, a heat treatment process to heat treat the casting, a machining process to machine the casting. Meanwhile, the data of the knowledge database related to casting manufacturing principles may include at least one of geometric design rules, properties of various metals and alloys used to form castings, properties of various materials used to form casting molds, characteristics of quench medias used to cool castings, characteristics of various casting processes, characteristics of various heat treatment processes, characteristics of various machining processes, characteristics of various heating stages of various heat treatment processes, characteristics of various solidification stages of various casting processes, and characteristics of various quenching and/or cooling stages of various heat treatment processes. The modification to the casting design recommended by at least one of the geometry analyzer, the casting evaluation tool, the residual stress evaluation tool, and the machining evaluation tool, may include a modification to data of the working database related to the manufacturing of the casting defined by the casting design. The casting design modified as recommended by at least one of the geometry analyzer, the casting evaluation tool, the residual stress evaluation tool, and the machining evaluation tool may be evaluated for manufacturability by the system.

In addition, optionally, the geometry analyzer may analyze the casting design by comparing with the search engine data of the working database and data of the knowledge database to determine the geometric design-ability of the casting design. The search engine may implement a forward chaining algorithm that compares data of the working database with data of the knowledge database. The geometry analyzer may further comprise a geometric casting design tool that creates and/or modifies a geometric design of the casting design for manufacturability evaluation by the system. The geometric casting design tool of the geometry analyzer may create and/or modify the geometric design of the casting design in a three-dimensional, computer animated design format and recognizes and accepts for manufacturability evaluation by the system geometric designs of casting designs created by conventional geometric casting design tools. The casting evaluation tool may evaluate the casting design for a potential for at least shrinkage and shrinkage porosity of a metal or alloy, or both, to form the casting defined by the casting design and a gas porosity of the casting defined by the casting design. The geometry modulus calculator may utilize a mesh generation and evaluation method or a rolling ball method to calculate or estimate geometric moduli of the casting defined by the casting design.

In accordance with yet another exemplary embodiment, a method of evaluating manufacturability of a casting design comprises: providing a system comprising at least one of a geometry analyzer, a casting evaluation tool, a residual stress evaluation tool, and a machining evaluation tool; determining at least one of: (A) a geometric design-ability of the casting design with the geometry analyzer by analyzing a geometric design of the casting design for compliance with geometric design rules of casting manufacturing principles; (B) a cast-ability of the casting design with the casting evaluation tool by evaluating the casting design for a potential for a formation of casting defects in a casting defined by the casting design with a geometry modulus calculator of the casting evaluation tool; (C) a heat treat-ability of the casting design with the residual stress evaluation tool by evaluating the casting design for stress levels and for a potential for a formation of cracks in the casting defined by the casting design with a stress level calculator of the residual stress evaluation tool; and (D) a machine-ability of the casting design with the machining evaluation tool by evaluating the casting design for a potential for a formation of cracks and for dimensional accuracy of the casting defined by the casting design with a distortion calculator of the machining evaluation tool; and optimizing the casting design for manufacturing by modifying the casting design as recommended by at least one of the geometry analyzer, the casting evaluation tool, the residual stress evaluation tool, and the machining evaluation tool if the casting design is determined as not geometrically design-able, not cast-able, not heat treat-able, or not machine-able by the geometry analyzer, the casting evaluation tool, the residual stress evaluation tool, or the machining evaluation tool, respectively. Optionally, the method may further comprise evaluating the manufacturability of a casting design modified as recommended by at least one of the geometry analyzer, the casting evaluation tool, the residual stress evaluation tool, and the machining evaluation tool.

BRIEF DESCRIPTION OF THE DRAWINGS

The following detailed description of specific embodiments can be best understood when read in conjunction with the following drawings, where like structure is indicated with like reference numerals and in which:

FIGS. 6A and 6B are illustrations of the cylinder head casting indicating areas having high potential for forming macroporosity;

Figure 1A:
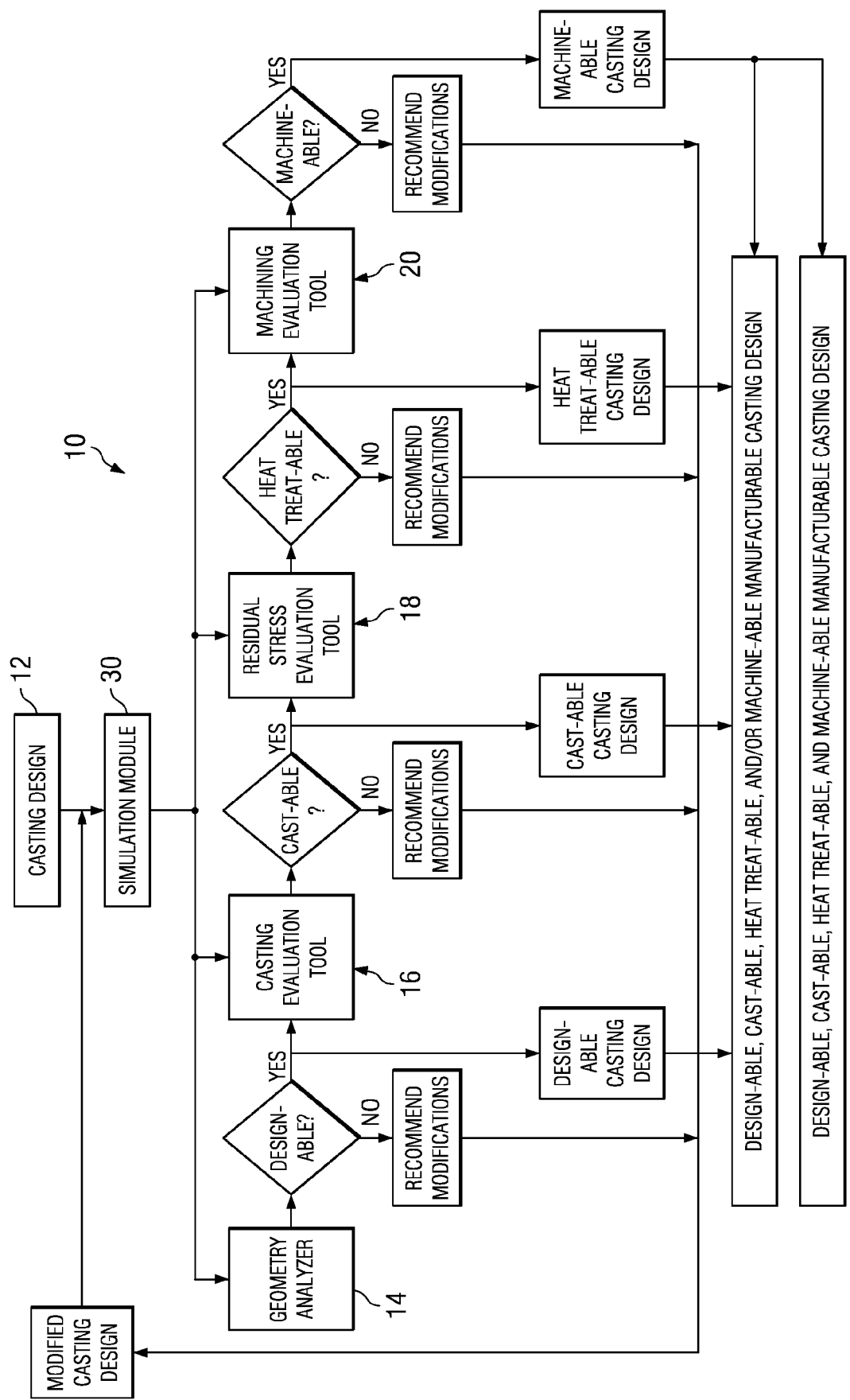
FIGS. 1A-1C are illustrations of flow charts of systems for evaluating manufacturability of casting designs according to various embodiments of the present invention.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION

Embodiments of the present invention relate generally to systems and methods for quickly and reliably evaluating manufacturability of casting designs. The casting design is a design of a casting that is proposed for manufacturing. As used herein, "casting design" refers to not only a geometric design of the proposed casting, but also characteristics of the casting to be formed, of the mold to shape the casting, and of the processes to manufacture the casting. As such, the casting design evaluated by the system described herein broadly includes data related to the manufacturing of a casting defined by the casting design. Such data includes, but is not necessarily limited to, a geometric design of the casting design, a metal or alloy, or both, to form the casting defined by the casting design, a material to form a casting mold to shape the casting defined by the casting design, a quench media to cool the casting defined by the casting design, a dimension of machining stock of the casting defined by the casting design, a casting process to form the casting defined by the casting design, a heat treatment process to heat treat the casting defined by the casting design, and a machining process to machine the casting defined by the casting design. The geometric design of the casting design generally is a three-dimensional computer animated geometric design. It is also contemplated that the geometric design may be one or two-dimensional and/or may be formatted in a geometric design other than that of computer animation.

Further, as used herein, a manufacturing process of a casting product or component generally involves a casting process, a heat treatment process, and a machining process. The casting process generally relates to the casting of a metal or alloy, or both, in a mold for shaping of the metal and/or alloy in conformance with the shape of the mold. Exemplary casting processes include, but are not limited to, sand casting, permanent mold casting, semi-permanent mold casting, squeeze casting, low pressure casting, and high pressure die casting. In addition, the metal to form the casting, i.e., to be cast in the mold, may include, but is not limited to, aluminum, magnesium, iron, and alloys thereof. As used herein, the heat treatment process, meanwhile, generally relates to the heating, quenching, and/or holding at a specific temperature or at various temperatures of the casting following the casting process. Various processes for heating, quenching, and holding the casting at a specific temperature or at various temperatures may be used. In addition, various types of quench media may be used to cool the casting in different manners and at different rates. Further, as used herein, the machining process generally relates to the machining of what generally is for the solidified cast. The machining process typically involves the provision of recesses, apertures, etc., to the solidified cast through pressing and/or drilling applications or other machining applications. It is also contemplated that the manufacturing process may include a geometric designing process that generally relates to designing, or creating, of a geometric design of a casting design. This geometric designing process is usually performed in a computer animated design environment and typically is completed prior to performance of the casting, heat treatment, and machining processes.

Figure 1B:
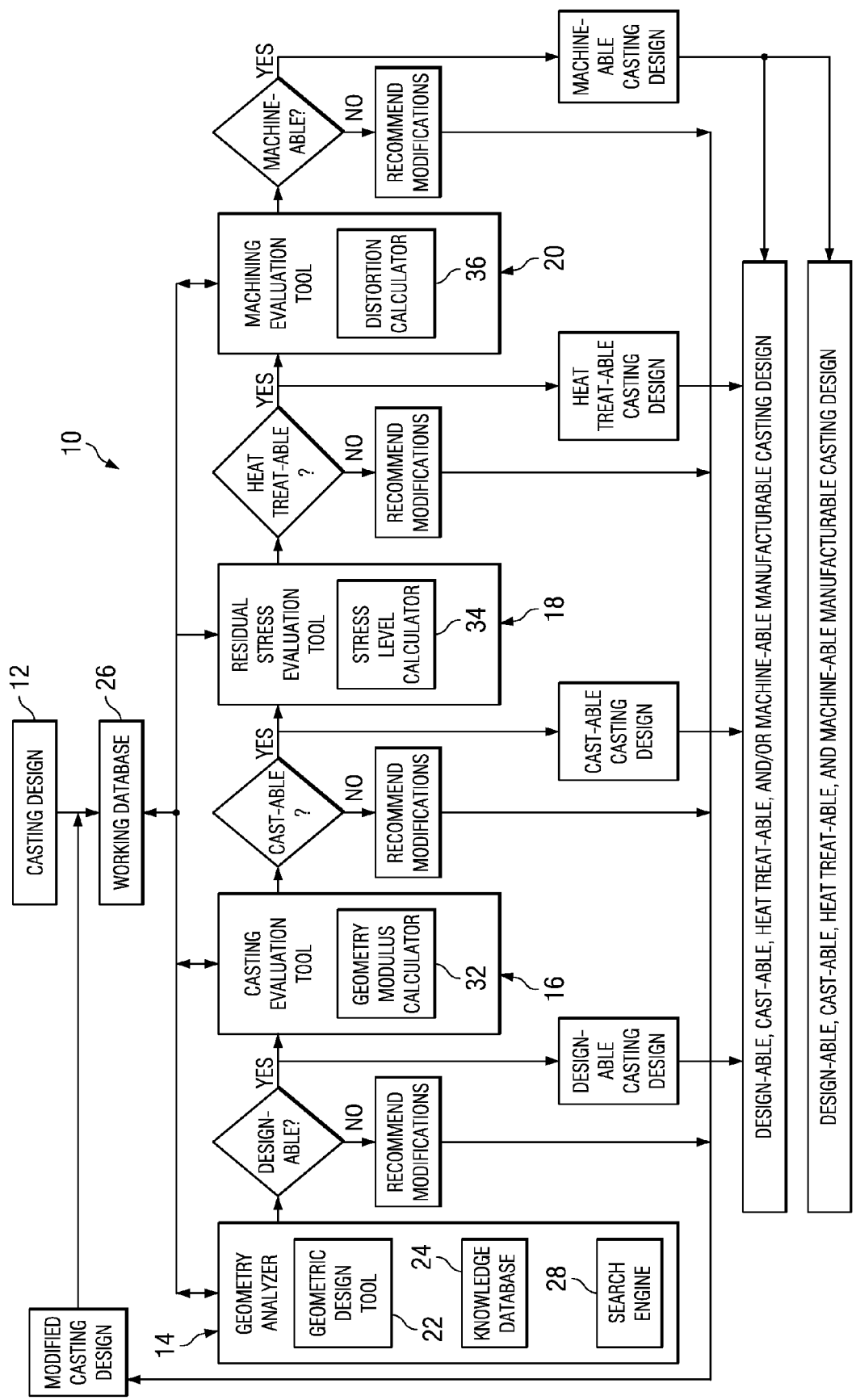
Figure 1C:
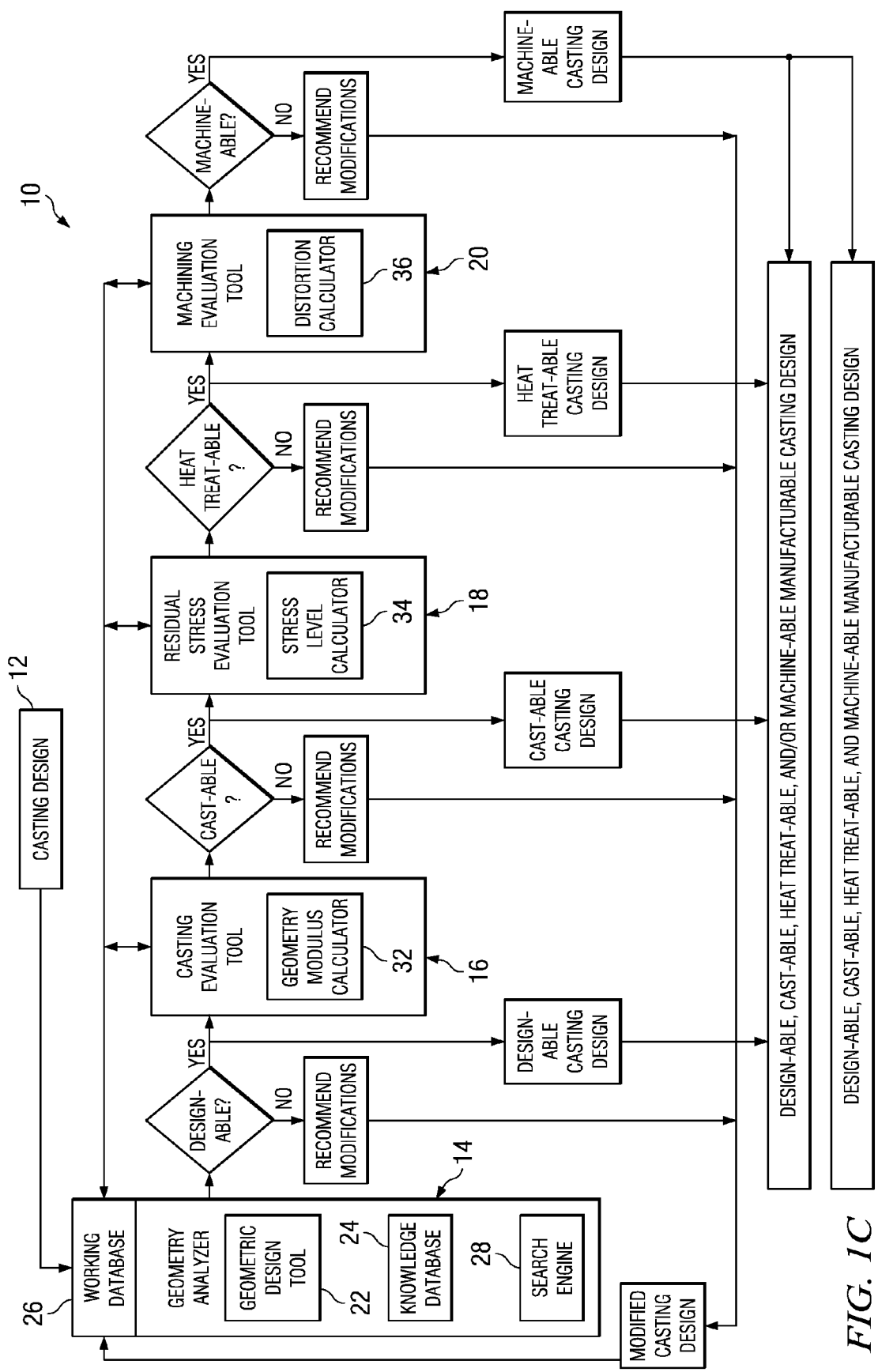
Figure 2:
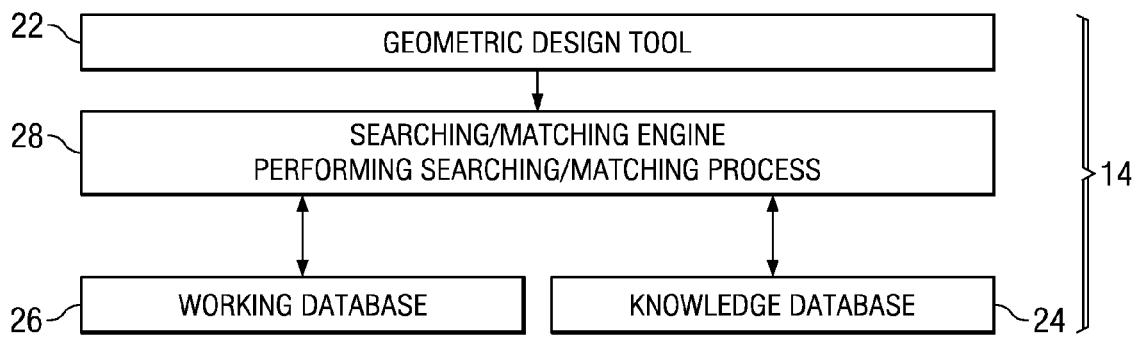
FIG. 2 is an illustration of a flow chart of a geometry analyzer of a system for evaluating manufacturability of a casting design according to another embodiment of the present invention.

Referring initially to FIG. 1, a system 10 for evaluating a manufacturability of a casting design 12 comprises a geometry analyzer 14, a casting evaluation tool 16, a residual stress evaluation tool 18, and a machining evaluation tool 20. The geometry analyzer 14 analyzes a geometric design of the casting design 12 to determine a geometric design-ability of the casting design for manufacturing purposes. More particularly, as shown in FIG. 2, the geometry analyzer 14 comprises a geometric design tool 22, a knowledge database 24, a working database 26, and a search engine 28. The geometric design tool 22 may create and modify a geometric design of the casting design 12. In addition, the geometric design tool 22 may recognize and accept, and modify, if desired, geometric designs of casting designs 12 created by conventional geometric casting design tools for geometric design-ability analysis by the geometry analyzer 14 and/or manufacturability evaluation by the system 10. The geometric designs created or recognized and accepted by the geometric casting design tool 22 may be one, two, or three-dimensional images that generally are formatted in a computer animated design. It is contemplated that the geometry analyzer 14 may be compatible for integration and operation with conventional geometric design tools that may create, modify, and/or recognize and accept geometric designs for casting designs 12. Conventional geometric casting design tools may include, but are not limited to, UniGraphics® and AutoCAD®.

To determine a geometric design-ability of a geometric design of a casting design 12, the geometry analyzer 14 analyzes the geometric design for compliance with the casting manufacturing principles. These casting manufacturing principles include generally understood principles of casting manufacturing that typically must be followed in order to have a manufacturable casting design 12. Tables 1-3, provided below, provide exemplary casting manufacturing principles. Specifically, Table 1 provides exemplary general casting manufacturing principles, Table 2 provides typical capabilities of common casting processes, and Table 3 provides exemplary wall thickness constraints commonly associated with different high pressure die cast materials, i.e., metals and alloys. It is contemplated, however, that casting manufacturing principles are not necessarily limited to those provided herein.

TABLE 1

General casting design rules

| | Rules | Brief Description |
|---|---|---|
| 1 | Design for Uniformity of Section | Uniform sections can keep the cooling rate relatively uniform and keep off stresses. The difference in relative thickness of adjoining sections should not exceed a ratio of 2:1. If a greater difference is unavoidable, use fillets and tapered sections. |
| 2 | Avoid Sharp Corners and Angles | In designing adjoining sections, replace sharp angles with radii and minimize heat and stress concentration. |
| 3 | Avoid casting strain | Reduce casting strains by using round corners (external), fillets (internal), uniform wall thickness and few rapid changes in wall thickness. |
| 4 | Fillet All Sharp Angles | To fulfill engineering stress requirements and reduce stress concentration, relatively large fillets may be used with radii equaling or exceeding casting section. Fillets that are too large are undesirable. |
| 5 | Minimize the Number of Sections Joining Together | To prevent uneven cooling, bring the minimum number of sections together or stagger them so that no more than two sections conjoin. When this is not possible, a circular web with adjoining sections or a cored hole through the center of the junction may be provided. |
| 6 | Eliminate Shrinkage or Porosity | Design all sections and memebers of a component increaseing in dimension progressively to one or more suitable areas where feeder/risers can be placed to offset liquid shrinkage. Decrease the maximum wall thickness if possible |
| 7 | Proportion inner dimensions | Inner sections of castings (resulting from complex cores) cool much slower than outer sections and cause variations in strength properties. A good rule is to reduce inner sections to 0.9 of the thickness of the outer wall. |
| 8 | Avoid Bosses, Lugs, and Pads | Bosses should not be used in casting design when the surface to support bolts may be obtained by milling or countersinking. When there are several lugs and bosses on one surface, they should be joined to facilitate machining. A panel of uniform thickness. |
| 9 | Maximize Design of Ribs and Brackets | Ribs and brackets can increase stiffness and carry offset loads introduce bending momentshave. However, avoid cross ribs or ribbing on both sides of a casting. Cross ribbing creates hot spots and makes feeding difficult. |
| 10 | Allow for material shrinkage and machine finish in dimensional tolerances | Consider shrinkage in all dimensions because most metals and alloys shrink when they solidify. Allow excess material for later machining of critical dimensions. |

TABLE 2

Typical capabilities of common casting processes

| | Casting Processes | | | | |
| --- | --- | --- | --- | --- | --- |
| | Sand Casting | Lost Foam Casting | Investment Casting | Permanent Mold Casting | High Pressure Die Casting |
| Maximum weight | <100 tons | <200 kg | <50 kg | <200 kg | <100 kg |
| Maximum size | <20 m | <1 m | <0.5 m | <1 m | <0.8 m |
| Minimum thickness | >4 mm | >3 mm | >1 mm | >3 mm | >1 mm |
| Minimum hole size | >8 mm | >5 mm | >4 mm | >6 mm | >2 mm |
| Dimensional tolerance | >0.6 mm | >0.5 mm | >0.1 mm | >0.4 mm | >0.05 mm |
| Surface roughness | >12 μm | >50 μm | >4 μm | >6 μm | >2 μm |
| Economic quantity | any number | >1000 | >100 | >1000 | >10 000 |
| Prototype lead time | >4 weeks | >8 weeks | >8 weeks | >8 weeks | >12 weeks |

TABLE 3

Wall thickness constraints associated with different high pressure die cast materials

| Surface areas | Alloys | | | |
| --- | --- | --- | --- | --- |
| ($cm^2$) | Al | Mg | Cu | Zn |
| Recommended minimum wall thickness (mm) | | | | |
| <25 | 1.0-1.5 | 1.0-1.5 | 1.5-2.0 | 0.5-0.75 |
| 25-200 | 1.5-2.0 | 1.5-2.0 | 2.0-2.5 | 0.75-1.5 |
| 100-500 | 2.0-2.5 | 2.0-2.5 | 2.5-3.0 | 1.5-2.0 |
| 500-2000 | 2.5-3.0 | 2.5-3.0 | 3.0-3.5 | 2.0-2.5 |
| 2000-5000 | 3.0-6.0 | 3.0-6.0 | 3.5-6.0 | 2.0-4.5 |
| Recommended maximum wall thickness (mm) | 10 | 8 | 8 | 6 |

Further, with respect to casting manufacturing principles, drafting may be utilized, particularly in sand casting processes, so that tooling can be withdrawn from the sand without damaging the imprint. Generally, the casting should allow a draft of at least one degree on walls with low aspect ratio and up to two degrees when available. Also, generally, for wall thickness, walls thinner than about three millimeters in sand casting processes can result in mis-runs or improper filling.

Data related to, and including, the casting manufacturing principles is stored in the knowledge database 24. As such, the data of the knowledge database 24 generally includes at least one of geometric design rules, properties of various metals and alloys commonly used to form castings, properties of various materials commonly used to form casting molds, characteristics of quench medias commonly used to cool castings, characteristics of various casting processes, characteristics of various heat treatment processes, characteristics of various machining processes, dimensions of various machining stock of castings, characteristics of various heating stages of various heat treatment processes, characteristics of various solidification stages of various casting processes, characteristics of various quenching and/or cooling stages of various heat treatment processes, and dimensions of various machining stock of castings. It is contemplated that the knowledge database 24 may be updated with new or additional data related to casting manufacturing principles and may permit the removal or deletion of data if desired.

The working database 26 comprises data related to the manufacturing of a casting defined by a casting design 12. Therefore, the working database 26 generally stores data specific to each casting design 12 being evaluated for manufacturability by the system 10. The data of the working database 24 generally includes any or all of the data described above with respect to the casting design 12 that is to be evaluated for manufacturability by the system 10. As shown in FIG. 2, the search engine 28 searches and attempts to match the data of the knowledge and working databases 24, 26 for coordination and/or differences. More particularly, the search engine 28 generally implements a forward chaining algorithm that compares the data of the working database 26 with the data of the knowledge database 24. The search engine 28 attempts to match measurements, dimensions, wall thicknesses, and other properties and characteristics of a casting design 12 with the casting manufacturing principles data of the knowledge database 20.

Thereby, the geometry analyzer 14 analyzes a geometric design of the casting design 12 by comparing with the search engine 28 the data of the working database 26 with the data of the knowledge database 24 to determine the geometric design-ability of the geometric design of the casting design 12. When substantial coordination with no or insignificant differences between the data of the knowledge and working databases 24, 26 is found to exist by the search engine 28, the geometry analyzer 14 generally determines the geometric design of the casting design 14 as geometrically design-able and, thus, optimal for manufacturing, or at least manufacturable. Conversely, when significant differences between such data are discovered by the search engine 28, the geometry analyzer 14 generally determines the geometric design of the casting design 12 as not geometrically design-able and, as such, must be geometrically re-designed in order to provide a casting design 12 with a geometric design that complies with the geometric design rules of the casting manufacturing principles and is manufacturable.

It is contemplated that geometric designs of casting designs provided by conventional geometric design tools may be evaluated by the conventional geometric design tools for compliance with geometric design rules of casting manufacturing principles prior to the acceptance of the geometric designs by the system 10. As such, such geometric designs need not necessarily be analyzed by the geometry analyzer 14. Rather, what may be referred to as these pre-approved casting designs for geometric design-ability may be subjected to evaluation by at least one of the casting evaluation tool 16, the residual stress evaluation tool 18, and the machining tool 20 upon acceptance of the pre-approved casting designs by the system 10.

The system 10 may evaluate casting designs 12, whether or not pre-approved for geometric design-ability, for manufacturability through multiple approaches. In one exemplary embodiment, illustrated in FIG. 1A, the system 10 subjects the casting design 12 to a computerized simulation module 30 to produce a virtual casting defined by the casting design 12. The virtual casting is run through at least one of a series of simulated manufacturing processes so as to enable the system 10 to evaluate the manufacturability of the casting design 12. In another exemplary embodiment, illustrated in FIG. 1B, the system 10 performs at least one of a series of calculations involving data of the knowledge base 24 and/or data of the working database 26 to achieve calculated results. The calculated results are evaluated by the system 10 to determine manufacturability of the casting designs 12. These calculations and evaluations are performed by the system 10 in a computer-based environment, i.e., a CAD environment, and, as such, do not require a simulation module 30 or the performance of simulated manufacturing processes to provide calculated results that may be necessary for manufacturability evaluation.

With respect to the exemplary embodiment of the system 10 in which the system 10 subjects the casting design 12 to a computerized simulation module 30, it is contemplated that either the system 10 may comprise a simulation module 30 or a simulation module 30 may be a conventional simulation module compatible with the system 10. The simulation module 30 may simulate performance of at least one of a process typically undertaken during the manufacturing of a casting. Such simulated processes may include a casting process, a heat treatment process, and a machining process. In this exemplary embodiment, it is through the simulated performance of at least one of the casting process, the heat treatment process, and the machining process that the system 10 evaluates the manufacturability of the casting design 12.

More particularly, the simulated casting process generally utilizes data of the geometry analyzer 14 specific to that casting design 12, such as, but not limited to, the metal or alloy to form the casting defined by the casting design 12, the material of the casting mold, and the selected casting process, to perform a simulated casting of the casting design 12 to form a virtual casting. The casting evaluation tool 16 of the system 10 evaluates the virtual casting cast through the simulated casting process for a formation of casting defects to determine a cast-ability of the casting design 12.

The evaluation of the virtual casting enables the casting evaluation tool 16 to determine the cast-ability of the casting design 12, i.e., the ability of the casting design 12 to cast substantially free of macro casting defects, or at least substantially free of significant macro casting defects. Casting defects may include, but are not limited to, shrinkage and gas porosity of a casting, whether virtual or not, defined by to the casting design 12. Hot spots for possible macro shrinkage may be identified through geometry modulus calculations, characteristics of the metal or alloy of the casting design 12, and the selected casting process of the casting design 12. Further, potential for a formation of macro gas porosity may be determined from the selected casting process, the material or materials forming the casting mold, a geometric design of the casting design 12, etc. Other aspects of cast-ability of the casting design 12, such as minimum cast-able holes, radii thereof, etc., may be evaluated according to the geometric design of the casting design 12 from the geometry analyzer 14 and the casting manufacturing principles data of the knowledge database 24 of the geometry analyzer 14.

The formation of macro shrinkage and gas porosity can be readily calculated or estimated from the hot spot potential described above. The hot spots are those generally isolated areas of a virtual casting or casting defined by the casting design 12 where solidification times are identified to be longer than those of surrounding areas of the virtual casting that are identified to solidify more quickly. Using the simulation module 30, the solidification time of various areas of the virtual casting can be calculated quickly without estimation. For a given metal or alloy and casting process, as defined by data in the working database 26, the local solidification time of a volume (V) of a virtual casting is directly related to the local volume-to-surface area (V/A) ratio, which may be referred to as the equivalent local geometry (section) modulus ($M_s$):

$$t_s = B\left(\frac{V}{A}\right)^2 = B(M_s)^2$$

where B is the Chvorinov's constant and is given as:

$$B = \frac{\pi}{4}\left(\frac{\rho_{casting}\Delta H_{casting}}{T_{Melting} - T_{mold,initial}}\right)^2 \left(\frac{1}{k_{mold}\rho_{mold}C_{mold}}\right) \text{ for a sand mold casting process}$$

and $$B = \left(\frac{\rho_{casting}\Delta H_{casting}}{h(T_{Melting} - T_{mold,initial})}\right) \text{ for a metal mold casting process}$$

where $\Delta H$ is the latent heat for the casting process (=$H_f$+ $\Sigma C_i \Delta T$), $H_f$ is the latent heat of solidification (fusion), h is the heat transfer coefficient, C is the specific heat, and $\rho$ is the density.

As such, when comparing solidification times over the virtual casting, to determine the hot spots, geometry moduli calculated by the simulation module 30 can be compared directly by the casting evaluation tool 16. This geometry modulus approach works best for casting configurations where the mold materials do not become saturated with heat. Further, a fundamental of the geometry moduli approach is based on an assumption that the casting mold material absorbs substantially the same amount of heat per unit mold/metal interfacial area. Further, since geometry moduli are only geometric quantities, comparison of the geometry moduli can be easily and quickly made in a computer animated design environment for hot spot check without running the simulation module 30 and the simulated casting process.

With respect to the embodiment of the system 10 that performs at least one of a series of calculations involving data of the knowledge base 24 and/or data of the working database 26 to achieve calculated results, the casting evaluation tool 16 comprises a geometry modulus calculator 32. Assuming that the simulation module 30 is unavailable or is not used, or at least not used to calculate the geometry moduli as described above, the geometry modulus calculator 32 calculates data of the working database 26 of the geometry analyzer 14 to calculate the geometry moduli of a casting defined by the casting design 12 to evaluate the casting design 12 for a potential for a formation of casting defects in the casting defined by the casting design 12 to determine a cast-ability of the casting design 12.

The geometry modulus calculator 32 may use a variety of computational geometry methods to obtain the geometric moduli of various parts of the casting defined by the casting design 12 in a CAD environment. Two examples of such computational geometry methods are described herein. One computational geometry method utilizes massive uniform grids generated from a boundary representation (B-Rep) of a CAD model of the casting design 12. The geometric modulus of an interested part (point) of the casting is then calculated according to the distance between the interested point (mesh) and the nearest boundary mesh. The nearest boundary mesh of the interested point (mesh) in the casting is determined by searching the nearest mesh that does not belong to the casting. This generally is a simple mesh generation and searching/comparing process and, as such, the geometric moduli of the casting defined by the casting design 12 in a CAD environment can be calculated quickly under this method. The accuracy of this method, however, is dependent upon the mesh size—the finer the mesh size, the higher the accuracy of the geometric modulus calculated.

Figure 3:
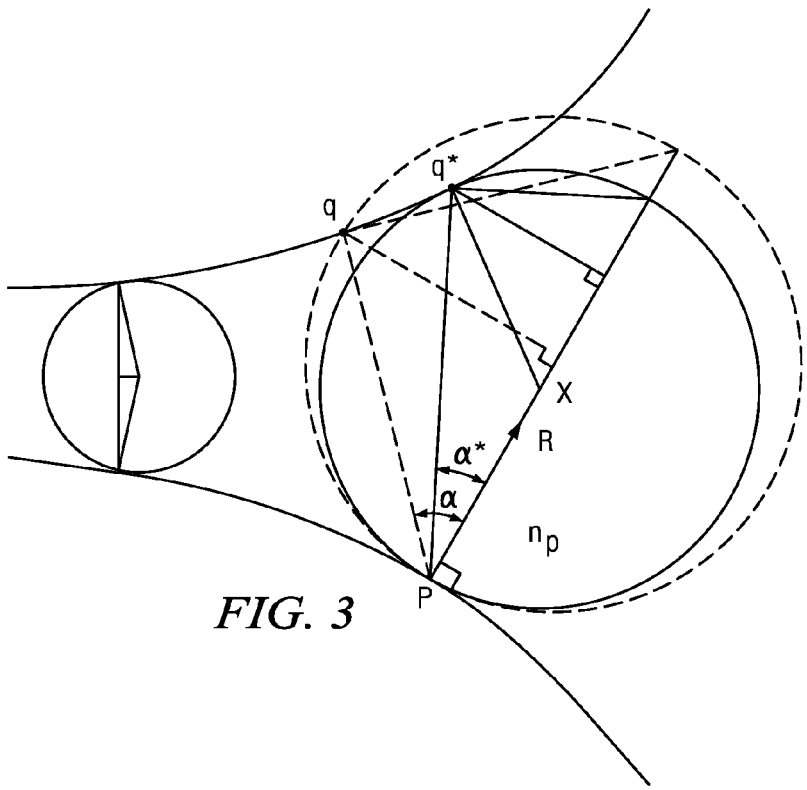
FIG. 3 is a schematic illustration of a rolling ball method to calculating geometric moduli of a casting defined by a casting design evaluated for manufacturability by a system according to one embodiment of the present invention.

A second computational geometry method, commonly referred to as the rolling ball (sphere) method, can also calculate quickly a maximum geometric modulus of an interested part of the casting defined by the casting design 12 in a CAD environment. FIG. 3 illustrates the basic concept of this method. A CAD model of the casting defined by the casting design 12 comprises of a set of B-Rep surfaces that define the casting's boundary, $\partial\Omega$, and have their normal directions oriented such that they point into the inertia of $\Omega$, the maximum geometric modulus of $\Omega$ at the point of p on the boundary surface is one third of the radius of the largest ball (sphere) contained within $\Omega$ and touching point p tangentially. For the algorithm and concept described here, balls (spheres) that touch the boundary surface tangentially, even when not fully contained in $\Omega$, are of great importance. Assuming that there is a ball (sphere) touching the surface tangentially at the point p and touching one other point q in $\partial\Omega$, this ball (sphere) will, in general, intersect with $\partial\Omega$. The maximal ball (sphere) associated with point p is simply the smallest ball (sphere) tangentially touching point p and at least one other point on the boundary $\partial\Omega$, like q shown in FIG. 3.

By definition the center of a ball (sphere), X, touching the surface tangentially at a point p, must lie somewhere on the line $$X = P + \hat{n}_p R$$

where $\hat{n}_p$ is the unit surface normal at the point p. When this rolling ball (sphere) also touches a point q, the value of R can be calculated by equating expressions for $\cos(\alpha)$ $$\cos(\alpha) = \frac{\hat{n}_p(q-p)}{\|q-p\|} = \frac{\|q-p\|}{2R} \quad (5)$$

giving $$R = \frac{\|q-p\|^2}{2\hat{n}_p(q-p)} \quad (6)$$

The finding of maximal balls (spheres) fully contained in $\Omega$ now becomes a simple minimization problem. For a set of parametric surfaces $\partial\Omega$ and the point p, the smallest value of R(q) of any q$\in\partial\Omega$ can be found from the smallest ball (sphere) that also tangentially contact the point q*. The local geometric modulus is then one third of the radius of this smallest ball (sphere).

Figure 4:
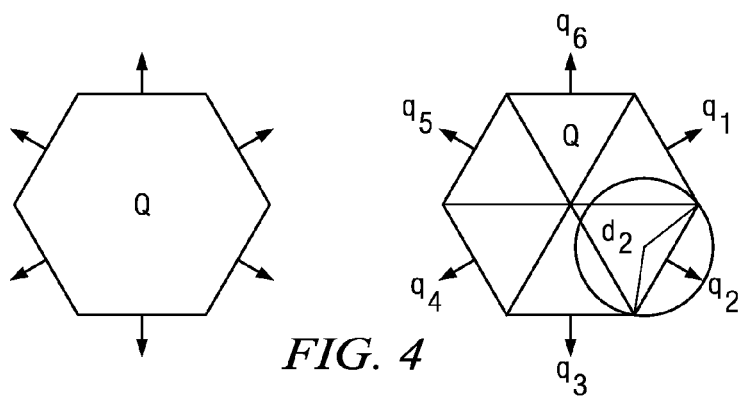
FIG. 4 is a schematic illustration of decomposition of total heat loss of a subsurface segment of a casting defined by a casting design evaluated for manufacturability by a system according to one embodiment of the present invention.

Further, as stated above, the geometric modulus approach relies strictly upon the geometric design of the casting design 12. Manufacturing processes often employ chills and other thermal modifications to control solidification stages of castings. To account for thermal effects associated with chill and other thermal variations in the casting mold, the inherent geometric modulus approach should be modified. FIG. 4 illustrates the basic concept of the modified geometry modulus approach. In the modified geometric modulus approach, the total heat loss of a casting is considered to be a combination of several components of heat loss, which are determined by combining local geometric design features and local heat transfer mechanisms. Generally, the total heat loss is not easily obtainable; however, each heat loss component may be easily obtained, provided that the surface of the element at the mold/casting interface is properly subdivided according to a local heat transfer mechanism.

To obtain the heat loss component for a particular subsurface segment, like q2 in FIG. 4, the ball (sphere) corresponding to that subsurface segment is used. In such a system, the ball (sphere) is assumed to be the same metal or alloy as that of the casting, while the surroundings are considered to be the same as that of the casting mold material in contact with the casting in this subsurface region. The interface condition between the casting and casting mold is identical to that defined in the original casting system. The assumptions lead to an identical heat transfer boundary condition everywhere for the entire ball (sphere). Therefore, the heat loss component can be easily obtained as a one-dimensional axisymmetrical problem.

In any local region, the heat transfer mechanisms can be classified as (1) mold-diffusion dominant (typical of sand casting processes), (2) part-diffusion dominant (typical of plastic injection molding casting processes), (3) interfacial-heat-transfer dominant (typical of die-casting processes), and (4) combinations of these mechanisms. Proper application of any of the first three mechanisms above will allow further simplification of the heat transfer problem.

The parameters of this one-dimensional heat transfer system consist of those corresponding to the local set of thermal parameters in the original casting system, including initial temperature, latent heat, superheat, and the dominate heat transfer mechanism. Therefore, the modified geometric modulus methodology is sensitive to the original casting design metal or alloy properties and solidification parameters.

Once all individual heat loss rate components are obtained through the series of one-dimensional axisymmetrical problems, as described above, the modified geometric modulus for the area of interest can be calculated easily. Thus, for any area of interest, the modified geometric modulus algorithm does not directly deal with the complex boundary conditions of the casting defined by the casting design as a whole; instead, the algorithm handles a number of uniform and simple boundary conditions to find each local heat loss rate component. The time average of these values is then added together to obtain the modified geometric modulus value (an overall heat loss rate) for the area of interest. This approach accounts for many different casting mold materials and interface conditions, thereby overcoming the limitations of the geometric modulus approach with respect to chill and other thermal variations.

Figure 5:
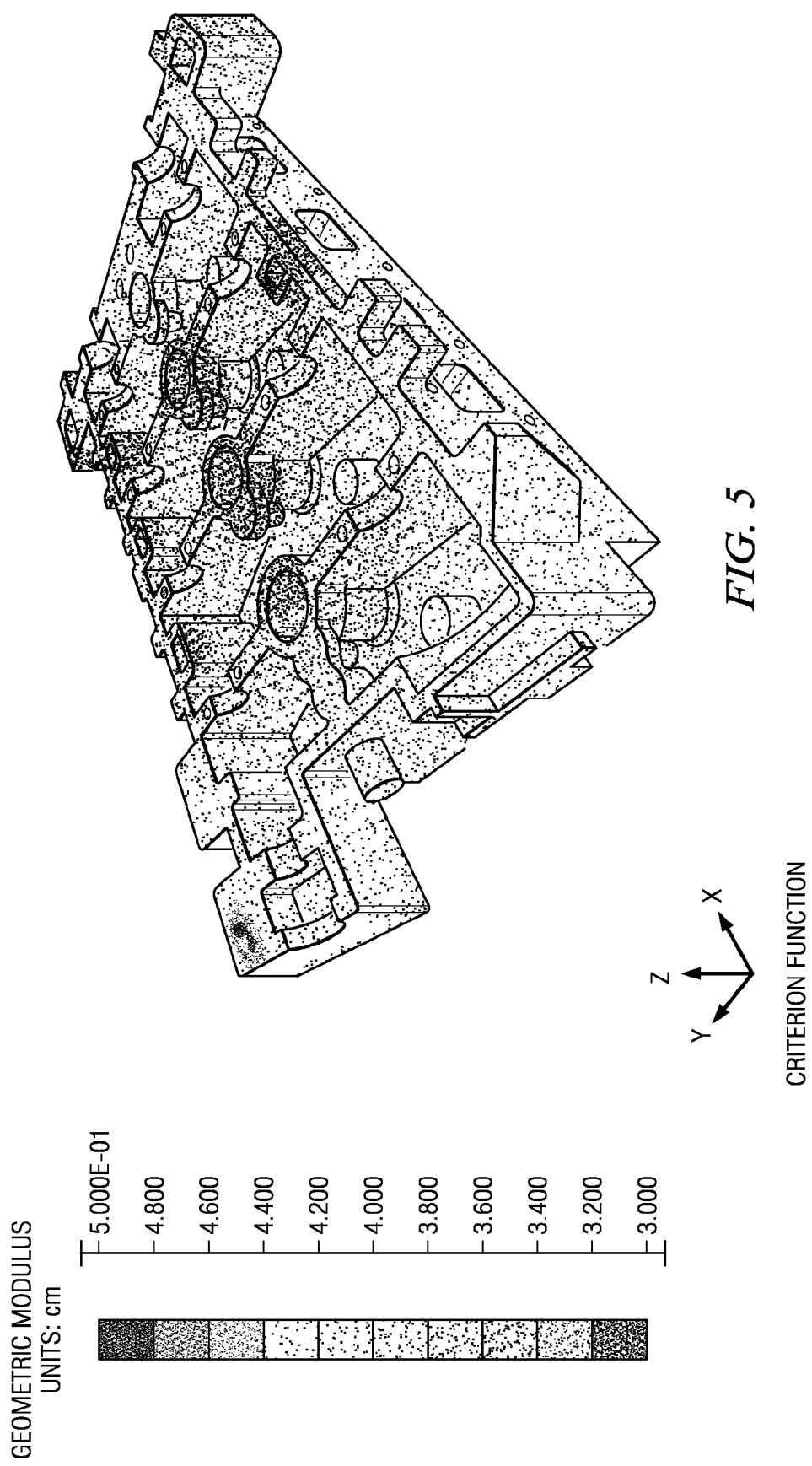
FIG. 5 is an illustration of a casting of a cylinder head and variations in calculated geometric moduli throughout the cylinder head.
Figure 6A:
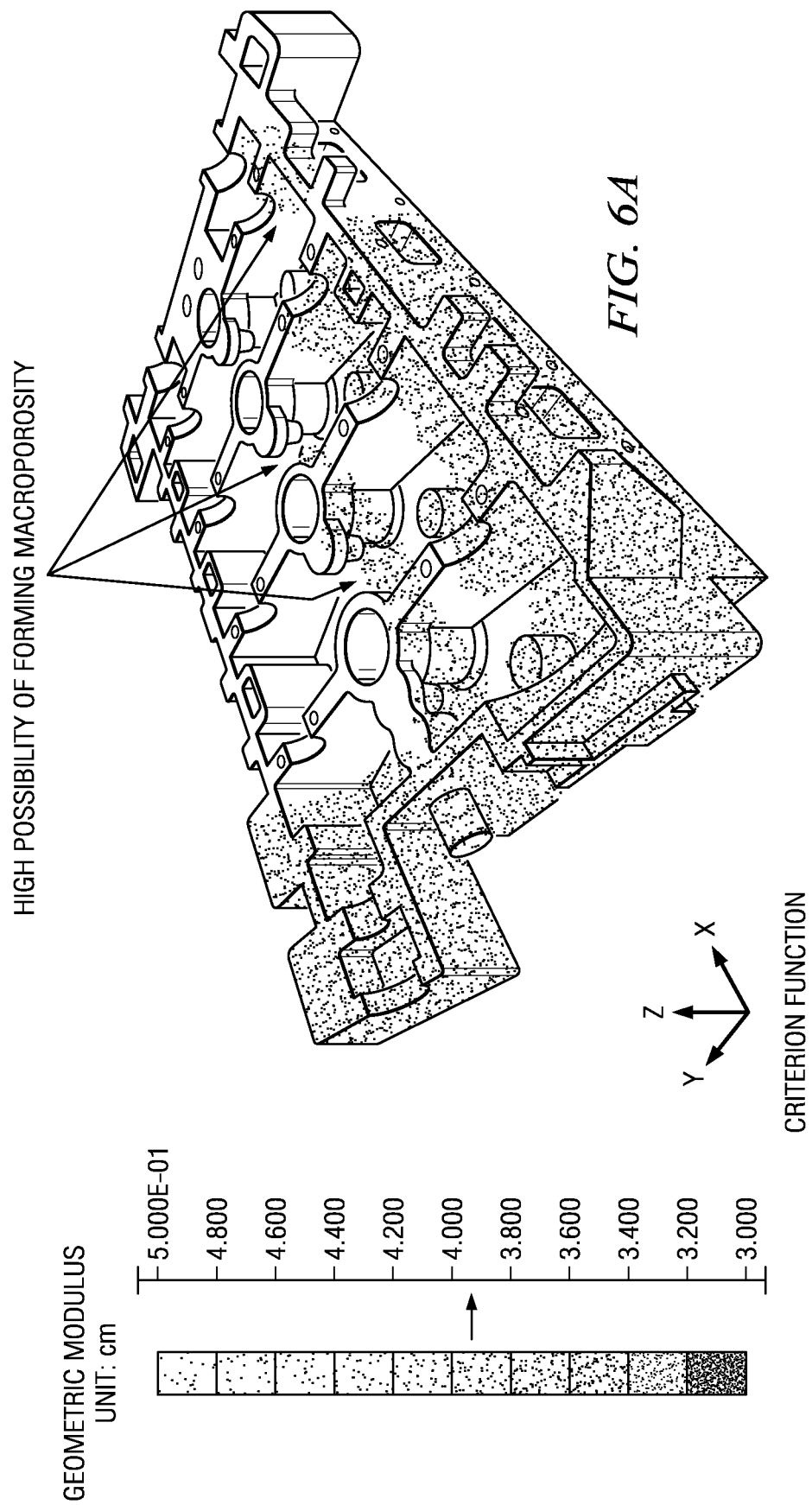

FIG. 5 illustrates the potential variations in the calculated geometric moduli of a casting of a cylinder head. FIG. 6, meanwhile, illustrates the areas of a cylinder head casting having high potential for forming macroporosity. Specifically, FIG. 6 identifies those areas having geometric moduli larger than 3.92 millimeters (FIG. 6A) and those areas having geometric moduli larger than 4.2 millimeters (FIG. 6B). As such, it is apparent that there may exist several areas of a casting (identified by arrows in FIGS. 6A and 6B) at which the geometric moduli are larger than those of surroundings, with the larger geometric moduli indicating areas as hot spots for macroporosity. During solidification stages, these areas will solidify last and develop macro shrinkage porosity. Accordingly, the casting evaluation tool 16 identifies the hot spot areas and their specific geometric design features. The casting evaluation tool 16 may also recommend what modifications may be needed to the geometric design, or other aspect of the casting design 12, or where the feeders (risers) should be placed should the geometric design not be modified.

Based on the foregoing, the casting evaluation tool 16 evaluates geometry moduli of castings defined by casting designs 12 determined through performance of a simulated casting process in the simulation module 30 or through a series of calculations involving data of the knowledge base 24 and/or data of the working database 26 to achieve calculated results with a geometry modulus calculator 32. These evaluations of the geometry moduli enables the casting evaluation tool 16 to identify a potential for a formation of casting defects and, thereby, to determine a cast-ability of the casting design 12. When the casting evaluation tool 16 finds that a potential for formation of macro casting defects in a casting defined by the casting design 12 does not exist or exits only to an insignificant degree, then the casting evaluation tool 16 generally determines the casting design 12 as cast-able and, thus, optimal for manufacturing, or at least manufacturable. Conversely, when a potential for a formation of macro casting defects exits, at least beyond an insignificant degree, then the casting evaluation tool 16 generally determines the casting design 12 as not cast-able and, as such, must be modified in order to provide a cast-able and manufacturable casting design 12.

The residual stress evaluation tool 18 evaluates a virtual casting heat treated through a simulated heat treatment process, via a simulation module 30, or evaluates results calculated by a stress level calculator 34 of the residual stress evaluation tool 18. Both of these evaluations enable the residual stress evaluation tool 18 to determine the heat treat-ability of the casting design 12, i.e., the ability of the virtual casting or casting defined by the casting design 12 to be heat treated, which generally includes heating, holding at a specific temperature or at various temperatures, and quenching, with insignificant stress levels and no or insignificant potential for a formation of cracks.

More particularly, the residual stress evaluation tool 18 evaluates the stress level and hot spots for cracking in virtual castings and castings defined by the casting designs 12 during cooling in solidification and quench processes. In an as-cast state, the casting stresses are generated from resistance to shrinkage generally due to the geometric designs of the casting designs 12 and, in particular, to the materials forming the casting molds. During a quench stage of a heat treatment process, residual stresses result from non-uniform cooling of castings. This non-uniform cooling generally is attributable to the geometric design and the selected quench media of the casting design 12. As such, residual stresses produced during the solidification and quench stages may be calculated using data of the knowledge database 24 and/or data of the working database 26, such as, but not limited to, material constitutive models, quench media, geometric design, the metal or alloy used, and mold materials used. In addition, tensile properties of metals and alloys at various temperatures may be used as criteria to evaluate the potential for a formation of cracks in castings.

Stress levels, and generally degrees of distortion as well, may be calculated by a simulation module 30 when available. However, when a simulation module 30 is unavailable or not used, stress levels, a potential for distortion, and a potential for a formation of cracks may be calculated in a CAD environment using a stress level calculator 34 of the residual stress evaluation tool 18. The stress level calculator 34 may use empirical equations to calculate residual stress and distortion with geometric designs, metals or alloys, selected casting processes, selected quench medias, etc., of the casting design 12. As such, the stress level calculator 34 may calculate data of the working database 26 of the geometry analyzer 14 to determine quickly stress levels of a casting defined by a casting design 12. For example, during a solidification stage of a casting process, residual stress can be expressed as:

$$\sigma_{r\text{-}cast} = f(M_s, \dot{M}_s, T_s, h_{tC}, \alpha R_m)$$

While during a quench stage of a heat treatment process, residual stress can be expressed as:

$$\sigma_{r\text{-}quench} = f(M_s, \dot{M}_s, \Delta T, h_{tC}, \alpha),$$

where $M_s$ is the geometric modulus (centimeters), $\dot{M}_s$ is the geometric modulus gradient (centimeters/centimeters) in the casting defined by the casting design 12, $T_s$ is the solidus of the casting material, $h_{tC}$ is the interfacial heat transfer coefficient during casting or quench, $\alpha$ is the thermal expansion (contraction) coefficient during casting or quench, $\Delta T$ is the quench temperature difference, and $R_m$ is the resistance of mold materials. For example, the residual stress (unit: MPa) in an A356 casting quenched from 540° C. to 75° C. water can be estimated as:

$$\sigma_{r\text{-}quench} = -1212 + 3333.3^*(M_s + 2\sqrt{\dot{M}_s}) \text{ for surface corner/angle areas, and}$$

$$\sigma_{r\text{-}quench} = -1212 + 3333.3^*(M_s) \text{ for all other areas.}$$

Figure 7:
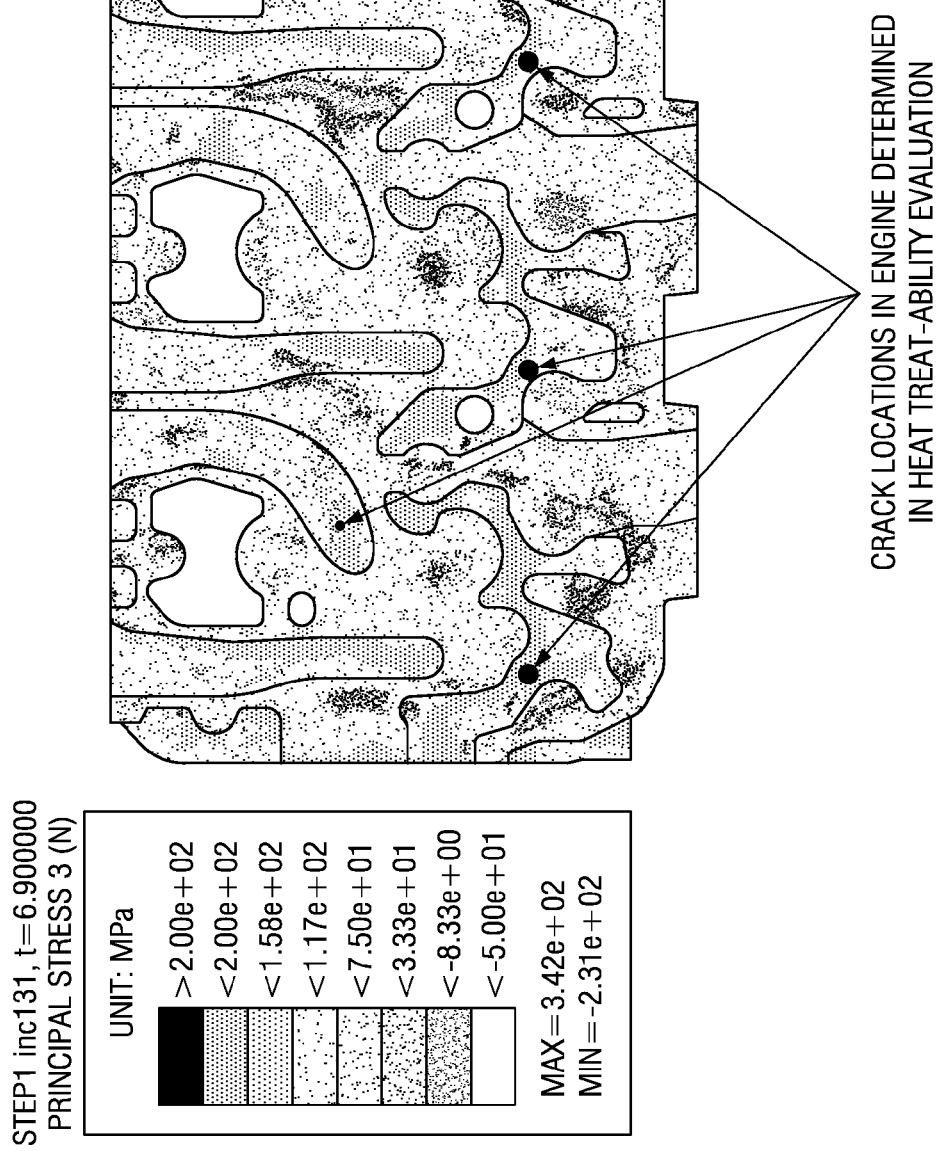
FIG. 7 is an illustration of a casting of a cylinder head and variations in calculated residual stress levels throughout the cylinder head.
Figure 8:
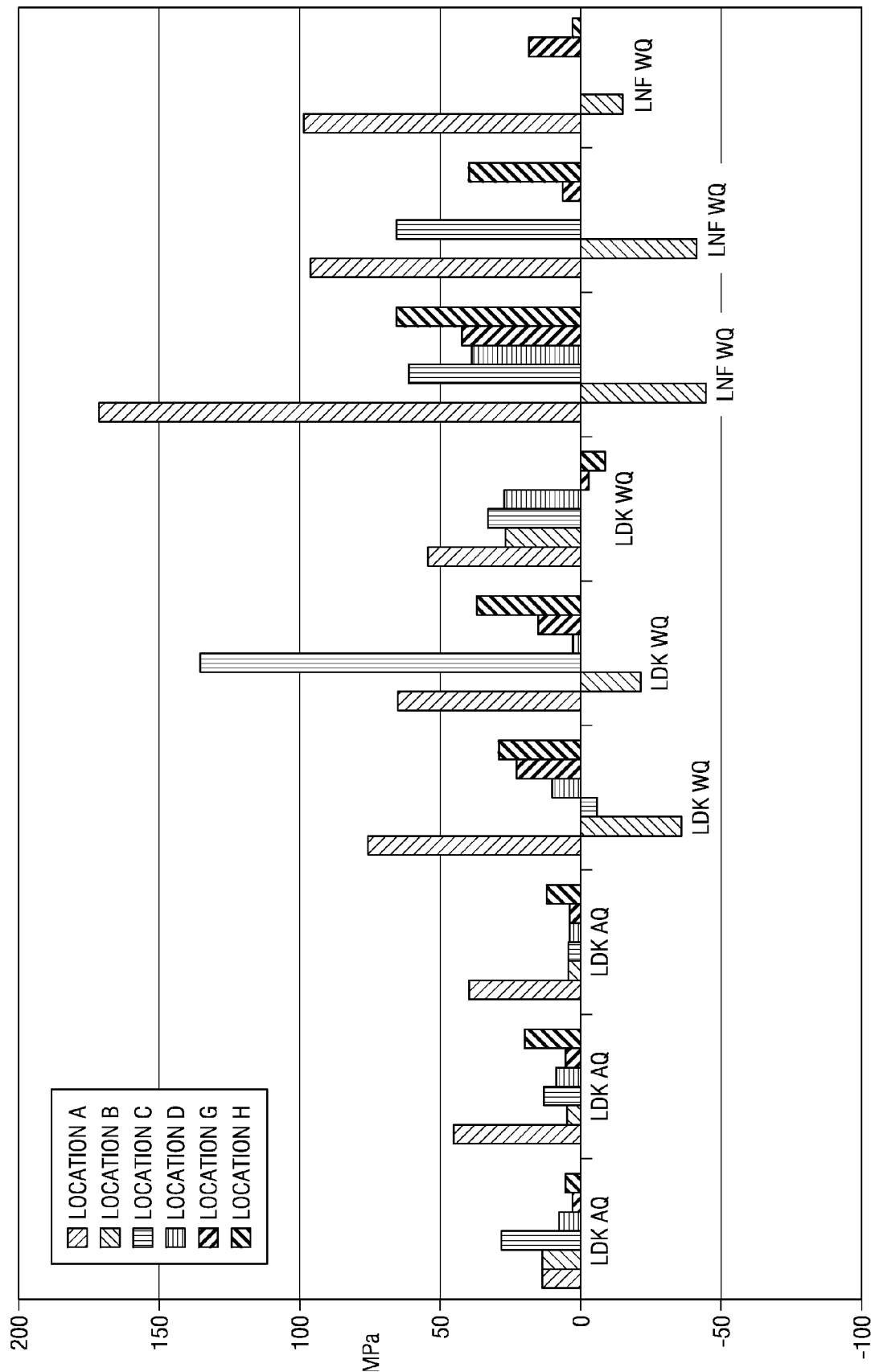
FIG. 8 is an illustration of a chart depicting a comparison of calculated residual stress levels of cylinder head castings cooled with a water quench media and an air quench media.

The calculated residual stress levels of the stress level calculator 34 may then be evaluated by the residual stress evaluation tool 18 to determine a heat treat-ability of the casting design 12. More particularly, if residual stresses are calculated, then the residual stress evaluation tool 18 may evaluate the calculated results to identify hot spots for possible cracking, as shown in FIG. 7, which identifies hot spot areas (identified by arrows in FIG. 7) having a potential for a formation of cracks in a casting of a cylinder head. If any such hot spots are identified, the residual stress evaluation tool 18 may recommend modifications to the casting design 12. For example, if the residual stress evaluation tool 18 determines that high residual stresses in the identified hot spots cannot be reduced simply by modifying a geometric design of the casting design 12, then the residual stress evaluation tool 18 may recommend modifying the casting design 12 to employ a different casting process or heat treatment process, e.g., a different solidification stage or quench stage. For example, a relatively gentle quench stage or media, such as an air quench in comparison to a water quench, as shown in FIG. 8, can significantly reduce residual stress. In general, metal mold casting tends to have higher as-cast residual stresses than sand casting. Also, generally, the more severe the quench process, the higher are the residual stresses and distortions. For the same alloy and casting process, the higher residual stresses in difference areas, or locations, of a casting are observed with utilization of water quench media in comparison with air quench media, as shown in FIG. 8.

Thus, based on the foregoing, the residual stress evaluation tool 16 evaluates residual stress levels of castings defined by casting designs 12 determined through a simulated heat treating process of a virtual casting in a simulation module 30 or through a series of calculations involving data of the knowledge base 24 and/or data of the working database 26 to achieve calculated residual stress level results with a stress level calculator 34. These evaluations of residual stress enable the residual stress evaluation tool 18 to determine stress levels of a casting of the casting design 12 and identify a potential for formation of cracks and distortion of the casting during a heat treatment process and, thereby, to determine a heat treatability of the casting design 12. When the residual stress evaluation tool 18 finds that a potential for high residual stress levels, a potential for a formation of cracks, and/or a potential for distortion does not exist or exits only to an insignificant degree, then the residual stress evaluation tool 18 generally determines the casting design 12 as heat treat-able and, thus, optimal for manufacturing, or at least manufacturable. Conversely, when a potential for high residual stress levels, a potential for a formation of cracks, and/or a potential for distortion exits, at least beyond an insignificant degree, then the residual stress evaluation tool 18 generally determines the casting design 12 as not heat treat-able and, as such, must be modified in order to provide a heat treat-able and manufacturable casting design 12.

The machining evaluation tool 20 evaluates results calculated and received from a simulation module 30 simulating a machining process or from a distortion calculator 36 of the machining evaluation tool 20. The evaluation of the calculated results enables the machining evaluation tool 20 to determine a potential for distortion of a casting defined by a casting design 12 from its computer animated geometric design, i.e., the geometric dimensional accuracy of the casting with the computer animated geometric design. In addition, the evaluation of the results, regardless of their source, enables the machining evaluation tool 20 to determine the machine-ability of the casting design 12, i.e., a tolerance of the casting design 12 to be machined with no or insignificant potential for formation of cracks or not meeting the dimension and/or tolerance requirements.

The machining evaluation tool 20 generally evaluates dimension accuracy and machining tolerance of castings defined by casting designs 12. For example, the machining evaluation tool 20 evaluates wall thickness, total geometry distortion due to thermal and residual stresses, dimensions of machining stock, or the like. This and other data can be calculated and provided by a simulation module 30 simulating a machining process. Alternatively, this and other data can be calculated with a distortion calculator 36 of the machining evaluation tool 20 in a CAD environment.

Overall attributes of the casting design 12, such as volume and surface area, may be directly extracted from the CAD model, while tolerance and surface finish requirements may be obtained from data of the knowledge and/or working databases 24, 26. Generally, machining surfaces have a machining stock of, for example, about three millimeters. Small casting features having dimensions of less than about three millimeters or holes with high aspect ratios typically are plugged and later machined. In addition, large machining surfaces often include additional machining stock to allow for parallelism and perpendicularity to datum points. Also, holes that require accurate drilling generally are filled. Further, it may be beneficial to put an undersized dimple where the hole should be to facilitate the machining process later. Casting features, such as nominal wall thickness, may be calculated by taking a ratio of volume to surface area, while actual wall thickness of defined areas may be calculated according to the above geometric modulus approach. By evaluating the calculated results, whether provided by a simulation module 30 or a distortion calculator 36, the machining evaluation tool 20 identifies areas of the casting that violate wall thickness constraints, such as minimum and maximum allowed wall thickness and sharp thickness variations over adjacent or nearby areas.

The accuracy of casting dimensions typically depends on the casting process used. For example purposes only, Table 4 lists the dimension tolerance on non-heat treated sand cast parts.

TABLE 4

Dimension tolerance on non-heat treated sand cast parts

| Dimension | Tolerance (millimeters(mm)) |
|---|---|
| Equal or smaller than 25 mm | +/−0.53 mm |
| Between 25 mm and 300 mm | 0.53 mm + 0.051 mm per 25 mm |
| Greater than 300 mm | 0.53 mm + 0.127 mm per 25 mm |
| Angles | +/−1° up to 76 mm |

In addition to the evaluation of the casting design 12 for potential distortions of casting dimensions against data of the knowledge and/or working databases 24, 26, actual dimensional accuracy of the casting after solidification and possible heat treatment may be evaluated by the machining evaluation tool 20. As mentioned above, when a simulation module 30 is available, the actual dimensional variation due to shrinkage and/or distortion may be calculated separately by the simulation module 30 with the calculated results being incorporated into the machining evaluation tool 20 for determining a machine-ability of the casting design 12.

The actual dimensional accuracy of the casting also may be calculated quickly in a CAD environment by a distortion calculator 36 of the machining evaluation tool 20. The distortion calculator 36 may utilize empirical equations that correlate shrinkage and distortion directly with geometric designs, metals or alloys, selected casting, heat treatment, and/or machining processes, selected quench medias, etc., of the casting design 12. As such, the distortion calculator 36 may calculate data of the knowledge and/or working databases 24, 26 of the geometry analyzer 14 to calculate quickly a dimensional accuracy of a virtual casting. For example, during a solidification stage of a casting process, the shrinkage ($\Delta l$) and distortion ($\mu$) may be expressed as:

$$\Delta l_{cast} = f(l, T_s, \alpha, R_m)$$

$$\mu_{cast} = f(M_s, \dot{M}_s, T_s, h_{tC}, \alpha, R_m)$$

Figure 9:
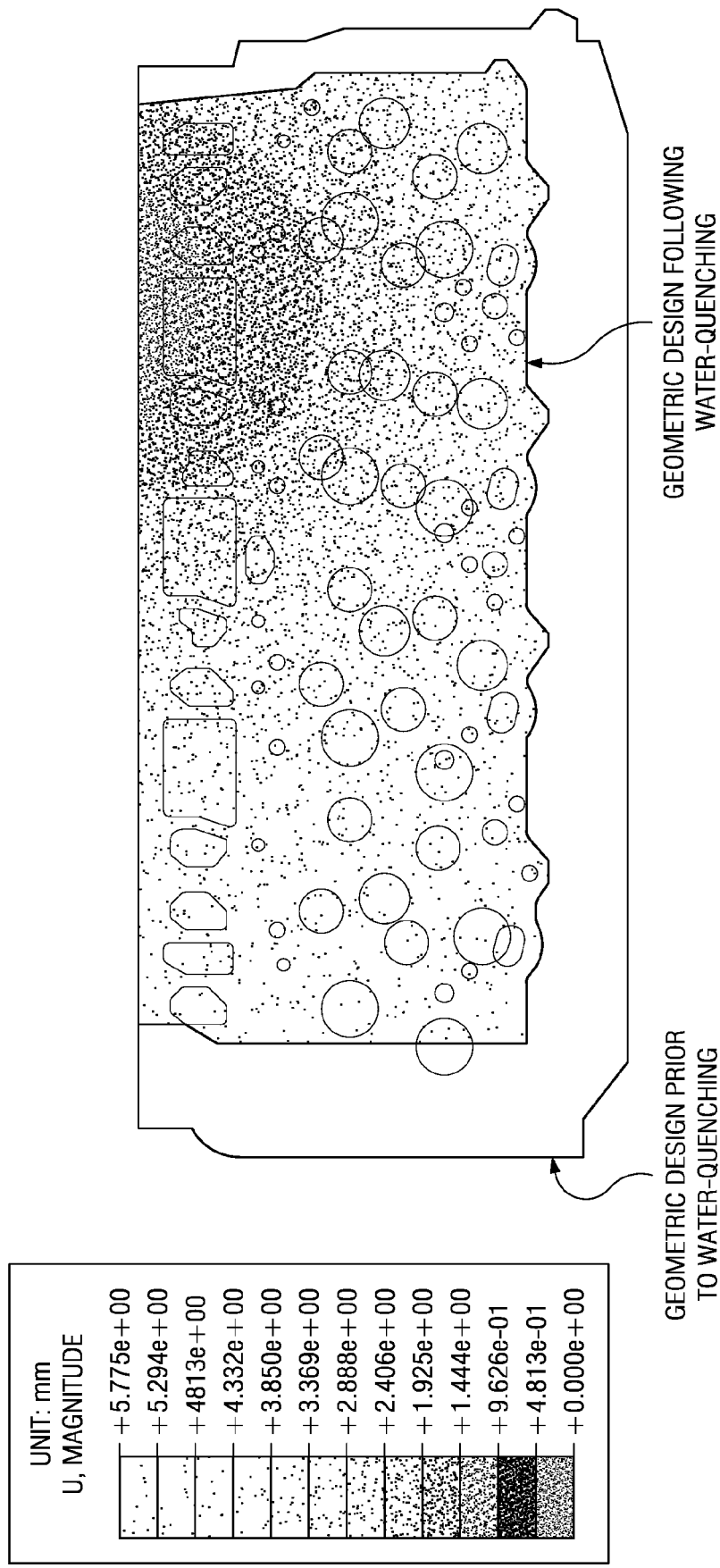
FIG. 9 is an illustration of a casting of a cylinder head and variations in distortion of the cylinder head cooled with water quench media.

While during a quench stage of a heat treatment process, the dimensional change ($\Delta l$) and distortion ($\mu$) may be expressed as:

$$\Delta l_{quench} = f(l, \Delta T, h_{tC}, \alpha)$$

$$\mu_{quench} = f(M_s, \dot{M}_s, \Delta T, h_{tC}, \alpha)$$

where $M_s$ is the geometric modulus (centimeters), $\dot{M}_s$ is the geometric modulus gradient (centimeters/centimeters) in the casting, l is characteristic length of the specific section or member of the casting, $T_s$ is the solidus of casting material, $h_{tC}$ is the interfacial heat transfer coefficient during casting or quench, $\alpha$ is the thermal expansion (contraction) coefficient during casting or quench, $\Delta T$ is the quench temperature difference, and $R_m$ is the resistance of mold materials. For example, the distortion (unit: mm) in an A356 casting quenched from 540° C. to 75° C. water can be estimated as:

$\mu_{quench} = 18.3 + 16 * \ln(M_s + 2\sqrt{M_s})$ for surface corner/angle areas, and $\mu_{quench} = 18.3 + 16 * \ln(M_s)$ for all other areas For example, FIG. 9 shows the distortion and dimension change calculated from these empirical equations of the distortion calculator 36 for a water-quenched cylinder head. When shrinkage and, in particular, distortion are calculated, hot spots for potential distortion, or variation from dimension accuracy, can be identified. If any such hot spots are identified, the machining evaluation tool 20 may recommend modifications to the casting design 12. For example, if the machining evaluation tool 20 determines that high distortion and/or shrinkage in the identified hot spots cannot be reduced simply by modifying a geometric design of the casting design 12, then the machining evaluation tool 20 may recommend modifying the casting design 12 to employ a different casting process or heat treatment process, e.g., a different solidification stage or quench stage. For example, a relatively gentle quench stage or media, such as an air quench, can significantly reduce distortion.

Thus, based on the foregoing, the machining evaluation tool 20 evaluates a casting defined by a casting design 12 for dimensional accuracy, a potential for shrinkage, a potential for distortion, and/or a potential for a formation of cracks determined through a simulated machining of a virtual casting in a simulation module 30 or through calculations involving data of the knowledge base 24 and/or data of the working database 26 to achieve calculated results with a distortion calculator 36. These evaluations enable the machining evaluation tool 20 to determine a machine-ability of casting designs 12. When the machining evaluation tool 20 finds that significant variation from dimensional accuracy, a potential for significant shrinkage, a potential for high distortion, and/or a potential for a formation of cracks does not exist or exits only to an insignificant degree, then the machining evaluation tool 20 generally determines the casting design 12 as machine-able and, thus, optimal for manufacturing, or at least manufacturable. Conversely, when significant variation from dimensional accuracy, a potential for significant shrinkage, a potential for high distortion, and/or a potential for formation of cracks exits, at least beyond an insignificant degree, then the machining evaluation tool 20 generally determines the casting design 12 as not machine-able and, as such, must be modified in order to provide a machine-able and manufacturable virtual casting.

As described above, when a casting design 12 is determined as not geometrically-designable, not cast-able, not heat treat-able, or not machine-able by the geometry analyzer 14, the casting evaluation tool 16, the residual stress evaluation tool 18, or the machining evaluation tool 20, respectively, the respective analyzer or evaluation tool recommends a modification to the casting design 12 to optimize the casting design 12 for manufacturing purposes. Thereby, a modification to the casting design 12 includes a modification to the data of the working database 26 specific to the casting design 12. It is contemplated that the casting design 12 modified as recommended may be evaluated for manufacturability by the system 10 to ensure that no further modifications are necessary to render the modified casting design 12 manufacturable.

Another exemplary embodiment of the present invention generally relates to a method of evaluating a manufacturability of a casting design 12. This method generally comprises: providing a system comprising a geometry analyzer, a casting evaluation tool, a residual stress evaluation tool, and a machining evaluation tool; determining a geometric design-ability of the casting design with the geometry analyzer by analyzing a geometric design of the casting design for compliance with geometric design rules of casting manufacturing principles; determining a cast-ability of the casting design with the casting evaluation tool by evaluating the casting design for a potential for a formation of casting defects in a casting defined by the casting design with a geometry modulus calculator of the casting evaluation tool; determining a heat treat-ability of the casting design with the residual stress evaluation tool by evaluating the casting design for stress levels and for a potential for a formation of cracks in the casting defined by the casting design with a stress level calculator of the residual stress evaluation tool; determining a machine-ability of the casting design with the machining evaluation tool by evaluating the casting design for a potential for a formation of cracks and for dimensional accuracy of the casting defined by the casting design with a distortion calculator of the machining evaluation tool; and optimizing the casting design for manufacturing by modifying the casting design as recommended by at least one of the geometry analyzer, the casting evaluation tool, the residual stress evaluation tool, and the machining evaluation tool if the casting design is determined as not geometrically designable, not cast-able, not heat treat-able, or not machine-able by the geometry analyzer, the casting evaluation tool, the residual stress evaluation tool, or the machining evaluation tool, respectively. It is contemplated that the method may further comprise evaluating the manufacturability of a casting design modified as recommended by at least one of the geometry analyzer, the casting evaluation tool, the residual stress evaluation tool, and the machining evaluation tool.

It is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A system for evaluating a manufacturability of a casting design, the system comprising at least one of a geometry analyzer, a casting evaluation tool, a residual stress evaluation tool, and a machining evaluation tool, wherein:

the geometry analyzer analyzes a geometric design of the casting design for compliance with a geometric design rule of casting manufacturing principles to determine a geometric design-ability of the casting design wherein the geometry analyzer analyzes the casting design by comparing search engine data of a working database against a knowledge database to determine the geometric design-ability of the casting design;

the casting evaluation tool evaluates a virtual casting defined by the casting design and cast through a simulated casting process, whereby the casting evaluation tool:

evaluates the geometric moduli of the virtual casting design without the use of breaking the casting design into a number of discrete pieces that correspond to a geometrically conventional surface or volume shape, and identifies the potential for formation of casting defects based on the geometric moduli to determine a cast-ability of the casting design;

the residual stress evaluation tool determines the residual stress levels of the virtual casting heat treated through a simulated heat treatment process for stress levels and for a formation of cracks due to cooling in the solidification and quenching process following heat treatment to determine heat treat-ability of the casting design;

the machining evaluation tool evaluates the virtual casting machined through a simulated machining process for at least one of a formation of cracks and dimensional accuracy to determine a machine-ability of the casting design; and at least one of the geometry analyzer, the casting evaluation tool, the residual stress evaluation tool, and the machining evaluation tool recommends a modification to the casting design to optimize the casting design for manufacturing if the casting design is determined as not geometrically design-able, not cast-able, not heat treat-able, or not machine-able by the geometry analyzer, the casting evaluation tool, the residual stress evaluation tool, or the machining evaluation tool, respectively.

2. The system of claim 1, wherein the modification to the casting design recommended by at least one of the geometry analyzer, the casting evaluation tool, the residual stress evaluation tool, and the machining evaluation tool includes a modification to at least one of a geometric design of the casting design, a metal or alloy of the casting design, a material to form a casting mold, a quench media, a dimension of machining stock of the casting design, a casting process, a heat treatment process and a machining process.

3. The system of claim 1, wherein the casting design modified as recommended by at least one of the geometry analyzer, the casting evaluation tool, the residual stress evaluation tool, and the machining evaluation tool is evaluated for manufacturability by the system.

4. The system of claim 1, wherein the geometry analyzer comprises a geometric casting design tool that creates the geometric design of the casting design for manufacturability evaluation by the system.

5. The system of claim 1, wherein the geometry analyzer recognizes and accepts for manufacturability evaluation of casting designs created by conventional geometric casting design tools and is compatible for integration and operation with conventional geometric casting design tools.

6. The system of claim 1, wherein the system further comprises a simulation module for performing at least one of the simulated casting process, the simulated heat treatment process, and the simulated machining process.

7. A system for evaluating a manufacturability of a casting design, the system comprising at least one of a working database, a geometry analyzer, a casting evaluation tool, a residual stress evaluation tool, and a machining evaluation tool, wherein:

the working database comprises data related to a manufacturing of a casting defined by the casting design;

the geometry analyzer comprises a search engine and a knowledge database that analyze data of the working database to evaluate the casting design for compliance with casting design principles to determine a geometric design-ability of the casting design wherein the geometry analyzer analyzes the casting design by comparing with the search engine data of the working database and data of the knowledge database to determine the geometric design-ability of the casting design;

the casting evaluation tool comprises a geometry modulus calculator that calculates data of the working database to evaluate the casting design for a potential for a formation of casting defects in the casting defined by the casting design to:

determine a cast-ability of the casting design without the use of breaking the casting design into a number of discrete pieces that correspond to a geometrically conventional surface or volume shape, and identify the potential for formation of casting defects based on the geometric moduli;

the residual stress evaluation tool comprises a stress level calculator that calculates data of the working database to evaluate the casting design for stress levels and for a potential for a formation of cracks due to cooling in the solidification and quenching process following heat treatment of the casting defined by the casting design to determine a heat treat-ability of the casting design;

the machining evaluation tool comprises a distortion calculator that calculates data of the working database to evaluate the casting design for a potential for a formation of cracks and for dimensional accuracy of the casting defined by the casting design to determine a machine-ability of the casting design; and at least one of the geometry analyzer, the casting evaluation tool, the residual stress evaluation tool, and the machining evaluation tool recommends a modification to the casting design to optimize the casting design for manufacturing if the casting design is determined as not geometrically design-able, not cast-able, not heat treat-able, or not machine-able by the geometry analyzer, the casting evaluation tool, the residual stress evaluation tool, or the machining evaluation tool, respectively.

8. The system of claim 7, wherein the working database is integrated into the geometry analyzer.

9. The system of claim 7, wherein the knowledge database comprises data related to casting manufacturing principles.

10. The system of claim 9, wherein:

the data of the working database related to the manufacturing of the casting defined by the casting design includes at least one of a geometric design of the casting design, a metal or alloy, or both, to form the casting, a material to form a casting mold, a quench media to casting, a dimension of machining stock of the casting, a casting process to form the casting design, a heat treatment process to heat treat the casting, a machining process to machine the casting, and the data of the knowledge database related to casting manufacturing principles includes at least one of geometric design rules, properties of various metals and alloys used to form castings, properties of various materials used to form casting molds, characteristics of quench medias used to cool the castings, characteristics of various casting processes, characteristics of various heat treatment processes, characteristics of various machining processes, dimensions of various machining stock of castings, characteristics of various heating stages of various heat treatment processes, characteristics of various solidification stages of various casting processes, and characteristics of various quenching stages of various heat treatment processes.

11. The system of claim 10, wherein the modification to the casting design recommended by at least one of the geometry analyzer, the casting evaluation tool, the residual stress evaluation tool, and the machining evaluation tool, includes a modification to data of the working database related to the manufacturing of the casting defined by the casting design.

12. The system of claim 7, wherein the search engine implements a forward chaining algorithm that compares data of the working database with data of the knowledge database.

13. The system of claim 7, wherein the geometry analyzer further comprises a geometric casting design tool that creates or modifies a geometric design of the casting design for manufacturability evaluation by the system.

14. The system of claim 13, wherein the geometric casting design tool of the geometry analyzer creates or modifies the geometric design of the casting design in a three-dimensional, computer animated design format and recognizes and accepts for manufacturability evaluation by the system geometric designs of casting designs created by conventional geometric casting design tools.

15. The system of claim 7, wherein the casting evaluation tool evaluates the casting design for a potential for at least shrinkage and shrinkage porosity of a metal or alloy, or both, to form the casting defined by the casting design and a gas porosity of the casting defined by the casting design.

16. The system of claim 15, wherein the geometry modulus calculator utilizes a mesh generation and evaluation method to calculate or estimate the geometric moduli of the casting defined by the casting design.

17. The system of claim 15, wherein the geometry modulus calculator utilizes rolling ball method to calculate or estimate geometric moduli of the casting defined by the casting design.

18. The system of claim 7, wherein the casting design modified as recommended by at least one of the geometry analyzer, the casting evaluation tool, the residual stress evaluation tool, and the machining evaluation tool is evaluated for manufacturability by the system.

19. A method of evaluating a manufacturability of a casting design, the method comprising:

providing a system comprising at least one of a geometry analyzer, a casting evaluation tool, a residual stress evaluation tool, and a machining evaluation tool;

determining a geometric design-ability of the casting design with the geometry analyzer by analyzing a geometric design of the casting design by comparing with a search engine data of a working database with data of a knowledge database to determine compliance with geometric design rules of casting manufacturing principles wherein the data of the working database is specific to the casting design and the data of the knowledge database comprises geometric design rules and casting manufacturing principles;

determining a cast-ability of the casting design with the casting evaluation tool by evaluating the casting design for a potential for a formation of casting defects in a casting defined by the casting design with a geometry modulus calculator of the casting evaluation tool without the use of breaking the casting design into a number of discrete pieces that correspond to a geometrically conventional surface or volume shape;

determining a heat treat-ability of the casting design with the residual stress evaluation tool by evaluating the casting design for stress levels and for a potential for a formation of cracks in the casting, due to cooling in the solidification and quenching process following heat treatment, defined by the casting design with a stress level calculator of the residual stress evaluation tool due to cooling in the solidification and quenching process following heat treatment of;

determining a machine-ability of the casting design with the machining evaluation tool by evaluating the casting design for a potential for a formation of cracks and for dimensional accuracy of the casting defined by the casting design with a distortion calculator of the machining evaluation tool; and optimizing the casting design for manufacturing by modifying the casting design as recommended by at least one of the geometry analyzer, the casting evaluation tool, the residual stress evaluation tool, and the machining evaluation tool if the casting design is determined as not geometrically design-able, not cast-able, not heat treatable, or not machine-able by the geometry analyzer, the casting evaluation tool, the residual stress evaluation tool, or the machining evaluation tool, respectively.

20. The method of claim 19, wherein the method further comprises evaluating the manufacturability of a casting design modified as recommended by at least one of the geometry analyzer, the casting evaluation tool, the residual stress evaluation tool, and the machining evaluation tool.

* * * * *